(No Model.)
S. C. MEAD.
VEHICLE WHEEL.
No. 410,645. Patented Sept. 10, 1889.
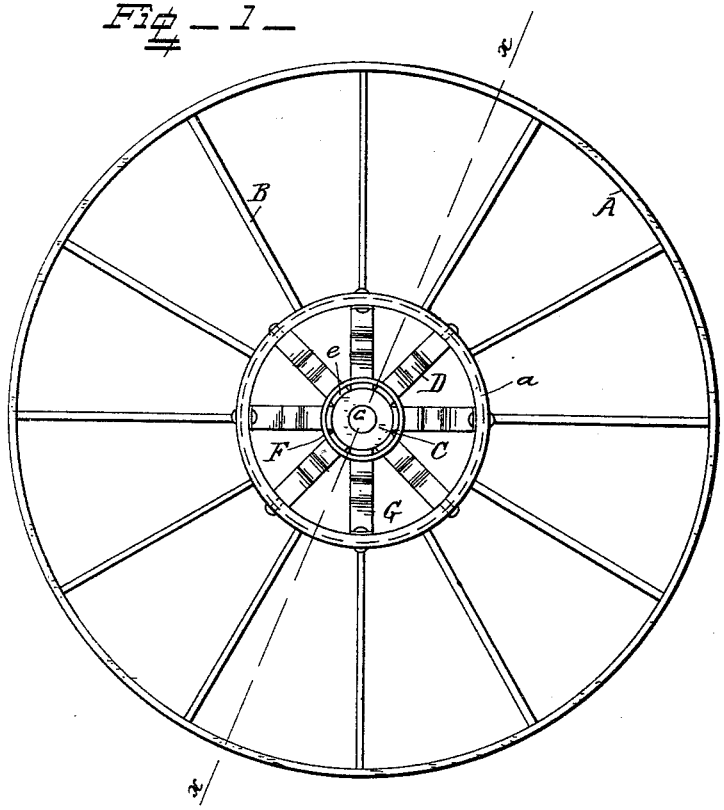
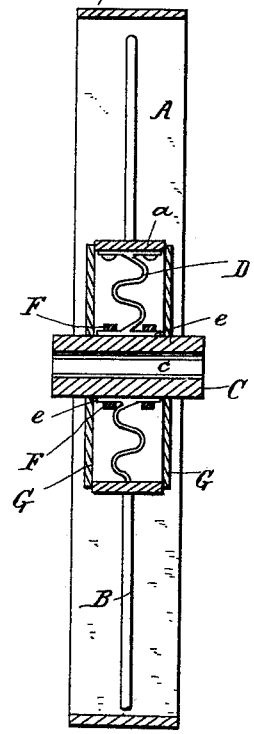
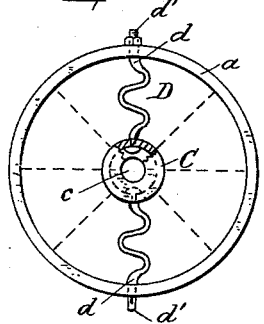
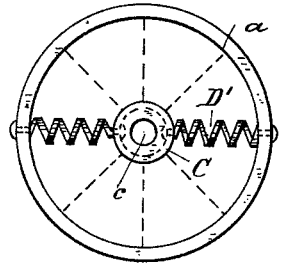
WITNESSES
Walter Allen
Geo. L. Wheelock
INVENTOR
S. C. Mead.
by Herbert W. T. Jenner.
Attorney

UNITED STATES PATENT OFFICE.

SAMUEL CLARK MEAD, OF GROVE, MICHIGAN.

VEHICLE-WHEEL.

SPECIFICATION forming part of Letters Patent No. 410,645, dated September 10, 1889.

Application filed June 7, 1889. Serial No. 313,429. (No model.)

*To all whom it may concern:*

Be it known that I, SAMUEL CLARK MEAD, a citizen of the United States, residing at Grove, in the county of Newaygo and State of Michigan, have invented certain new and useful Improvements in Vehicle-Wheels; and I do hereby declare the following to be a full, clear, and exact description of the invention, such as will enable others skilled in the art to which it appertains to make and use the same.

This invention relates to vehicle-wheels; and it consists in the novel construction and combination of the parts, as hereinafter fully described and claimed, whereby the rim of the wheel is supported upon springs and connected to the hub.

In the drawings, Figure 1 is a side view of the wheel, and Fig. 2 is a cross-section through the same on line $x\ x$. Fig. 3 is a detail view showing various simple modifications in the method of securing the ends of the springs, and Fig. 4 is a detail view showing a modification in the form of the springs.

A is the rim of the wheel, which may be of any approved construction, and $a$ is a concentric ring inside the rim.

B are the spokes, which are firmly and rigidly secured to the rim and to the said ring in any convenient manner.

C is the hub of the wheel, provided with a hole $c$ for the axle in the usual manner.

D are corrugated springs interposed radially between the hub and the ring $a$ and having their ends firmly secured to each. For light wheels coiled spiral springs D', as shown in Fig. 4, may be used, if desired; but for heavy wheels the springs D, of flat bar-steel, bent to form corrugations, as shown in Figs. 1, 2, and 3, are preferred. The ends of the springs may be secured to the hub and to ring $a$ in various ways. In Fig. 3 square shoulders $d$ are formed on each end of the spring, which shoulders abut against the hub and ring, and $d'$ are projections which pass through holes in the said ring and hub and have their ends riveted over on the opposite side, or secured by screw-threaded nuts or by keys, as found convenient. The ends of the springs may also be secured to the hub, as shown in Figs. 1 and 2, in which $e$ are flanges upon the ends of the springs which rest against the hub, and F are rings which encircle the said flanges and the hub and clamp them securely together.

G are cover-plates which are secured to the hub on each side of the springs with their circumferences resting against the sides of the ring $a$. These plates inclose the springs and protect them from dirt and injury. These cover-plates, however, are not an essential feature of the invention, and may be dispensed with, if desired. The springs interposed between the hub and the concentric ring prevent the full force of the jolts and jars of the road from being transmitted through the rim of the wheel to the hub.

What I claim is—

1. In a vehicle-wheel, the combination, with the rim, the inner concentric ring, and the spokes uniting the said ring and rim, of a hub inside the concentric ring, and radially-arranged springs of corrugated flat bar-steel interposed between and having their ends secured to the said hub and ring, substantially as set forth.

2. In a vehicle-wheel, the combination, with the rim, the inner concentric ring, and the spokes uniting the said ring and rim, of a hub inside the concentric ring, the radially-arranged springs interposed between and having their ends secured to the said hub and ring, and the cover-plates secured to the hub with their circumferences resting against the sides of the concentric ring, substantially as set forth.

3. In a vehicle-wheel, the combination, with the rim, the inner concentric ring, and the spokes uniting the said ring and rim, of the hub, the radially-arranged springs secured at one end to the said ring and provided with flanges at the other end resting against the hub, and the rings encircling the said flanges and hub and securing them together, substantially as set forth.

In testimony whereof I affix my signature in presence of two witnesses.

SAMUEL CLARK MEAD.

Witnesses:
FRANK ROBINSON,
SETH C. WATROUS.